US006195749B1

(12) United States Patent
Gulick

(10) Patent No.: US 6,195,749 B1
(45) Date of Patent: Feb. 27, 2001

(54) COMPUTER SYSTEM INCLUDING A MEMORY ACCESS CONTROLLER FOR USING NON-SYSTEM MEMORY STORAGE RESOURCES DURING SYSTEM BOOT TIME

(75) Inventor: Dale E. Gulick, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/501,888

(22) Filed: Feb. 10, 2000

(51) Int. Cl.[7] .................................................. G06F 9/445
(52) U.S. Cl. ........................................................... 713/1
(58) Field of Search ................... 713/1, 2, 100; 710/104

(56) References Cited

U.S. PATENT DOCUMENTS

| | | |
|---|---|---|
| 4,118,773 | 10/1978 | Raguin et al. . |
| 4,503,491 | 3/1985 | Lushtak et al. . |
| 4,713,759 | 12/1987 | Yamagishi et al. . |
| 5,005,157 | 4/1991 | Catlin . |
| 5,151,876 | 9/1992 | Ikeda . |
| 5,245,572 | 9/1993 | Kosonocky et al. . |
| 5,307,497 | 4/1994 | Feigenbaum et al. . |
| 5,768,584 | 6/1998 | MacDonald et al. . |
| 5,859,987 | * 1/1999 | Gillespie et al. ..................... 710/128 |

OTHER PUBLICATIONS

Mayer et al., "Dynamic EPROM Size Detector," Motorola Technical Developments, vol. 14, Dec. 1991, pp. 109.
Jex, "Flash Memory BIOS for PC and Notebook Computers," Communications, Computers, and Signal Processing, 1991, pp. 692–695.

* cited by examiner

Primary Examiner—Thomas M. Heckler
(74) Attorney, Agent, or Firm—Conley, Rose & Tayon, PC; B. Noël Kivlin

(57) ABSTRACT

A computer system including a memory access controller for using non-system memory storage resources during system boot time. A computer system includes a microprocessor, a system memory and a plurality of peripheral devices coupled to the microprocessor through one or more buses. A system controller and a peripheral bus controller control the buses. Many peripheral device controllers contain buffer memory used during normal system operation, by the peripheral device controllers, to buffer data between the computer system and the peripheral devices. The computer system also includes a memory access controller and a configuration storage unit. The configuration storage unit stores configuration control information which causes control logic to configure the buffer memory. The memory access controller controls accesses to the buffer memory associated with the peripheral devices during system initialization to allow use of the buffer memory as a stack or scratchpad RAM.

13 Claims, 4 Drawing Sheets

COMPUTER SYSTEM INCLUDING A MEMORY ACCESS CONTROLLER FOR USING NON-SYSTEM MEMORY STORAGE RESOURCES DURING SYSTEM BOOT TIME

BACKGROUND OF THE INVENTION

1. Field of the Invention

This invention relates to computer systems and, more particularly, to memory resource utilization during system boot code execution.

2. Description of the Related Art

Current computer systems typically include a microprocessor, system memory, and a plurality of peripheral devices such as video graphics adapters, network controllers, modems, game controllers, and serial communications controllers. The memory and peripheral devices are typically coupled to the microprocessor through one or more system buses. In Personal Computers (PCs) these buses are controlled by bridge logic, which is commonly separated into two distinct Integrated Circuits (ICs): the system controller and the peripheral bus controller. The system controller commonly referred to as a northbridge in PC systems, includes such devices as a system bus interface, a memory controller, a Peripheral Component Interconnect (PCI) bus controller, and an Accelerated Graphics Port (AGP). The peripheral bus controller commonly referred to as a southbridge in PC systems, includes such devices as a PCI to Industry Standard Architecture (ISA) bridge, an Enhanced Integrated Device Electronics (EIDE) controller, and a Universal Serial Bus (USB) controller.

During the power-up sequence or after a system reset, the microprocessor must execute initialization code that is typically stored in an external Read-Only Memory (ROM). This code is referred to as Basic Input and Output System (BIOS) code. The BIOS is responsible for system level operations such as initializing and testing the system hardware. This portion of code is known as Power On Self Test (POST). The BIOS is also responsible for loading and running the system software in a bootstrap routine. In addition, the BIOS manages the system default, or setup hardware conditions and helps the system software manage system resources during normal system operation through the use of BIOS run-time services.

A problem associated with current computer systems is that prior to the POST routine initializing and testing the main system memory, the microprocessor has relatively few registers to use as a stack or scratchpad memory. As computer systems continue to increase in complexity, this lack of memory makes writing BIOS code increasingly more difficult as the BIOS code is required to do more. Therefore, it is desirable to have access to some memory space during the execution of the POST.

SUMMARY OF THE INVENTION

The problems outlined above may in large part be solved by a computer system including a memory access controller for using non-system memory storage resources during system boot time.

In one embodiment, the computer system includes a microprocessor coupled to a system memory through a system controller, such as a northbridge. A peripheral bus controller, such as a southbridge, may be coupled to the system controller through a first peripheral bus. One or more peripheral devices may be coupled to the system controller through the first peripheral bus. Additionally, one or more peripheral devices may be coupled to the peripheral bus controller through a second peripheral bus. A memory unit for storing boot code, such as a BIOS ROM, may be operatively coupled to the microprocessor through the peripheral bus controller for storing boot code to allow the system to perform initialization procedures. The computer system includes a memory access controller for controlling accesses to a buffer memory associated with one of the peripheral devices during system initialization to advantageously allow use of the buffer memory as a stack or scratchpad random access memory (RAM).

In one particular implementation, a buffer memory associated with a Local Area Network (LAN) controller, which is configured in a first in/ first out (FIFO) arrangement, may advantageously be utilized as stack or scratch pad RAM during system initialization.

In other embodiments, the buffer memory associated with other peripheral devices may be utilized during system initialization. For example, in one embodiment, storage such as a cache memory associated with a disk controller may be configured and utilized as a stack or scratch pad RAM.

BRIEF DESCRIPTION OF THE DRAWINGS

Other objects and advantages of the invention will become apparent upon reading the following detailed description and upon reference to the accompanying drawings in which.

Figure 1:
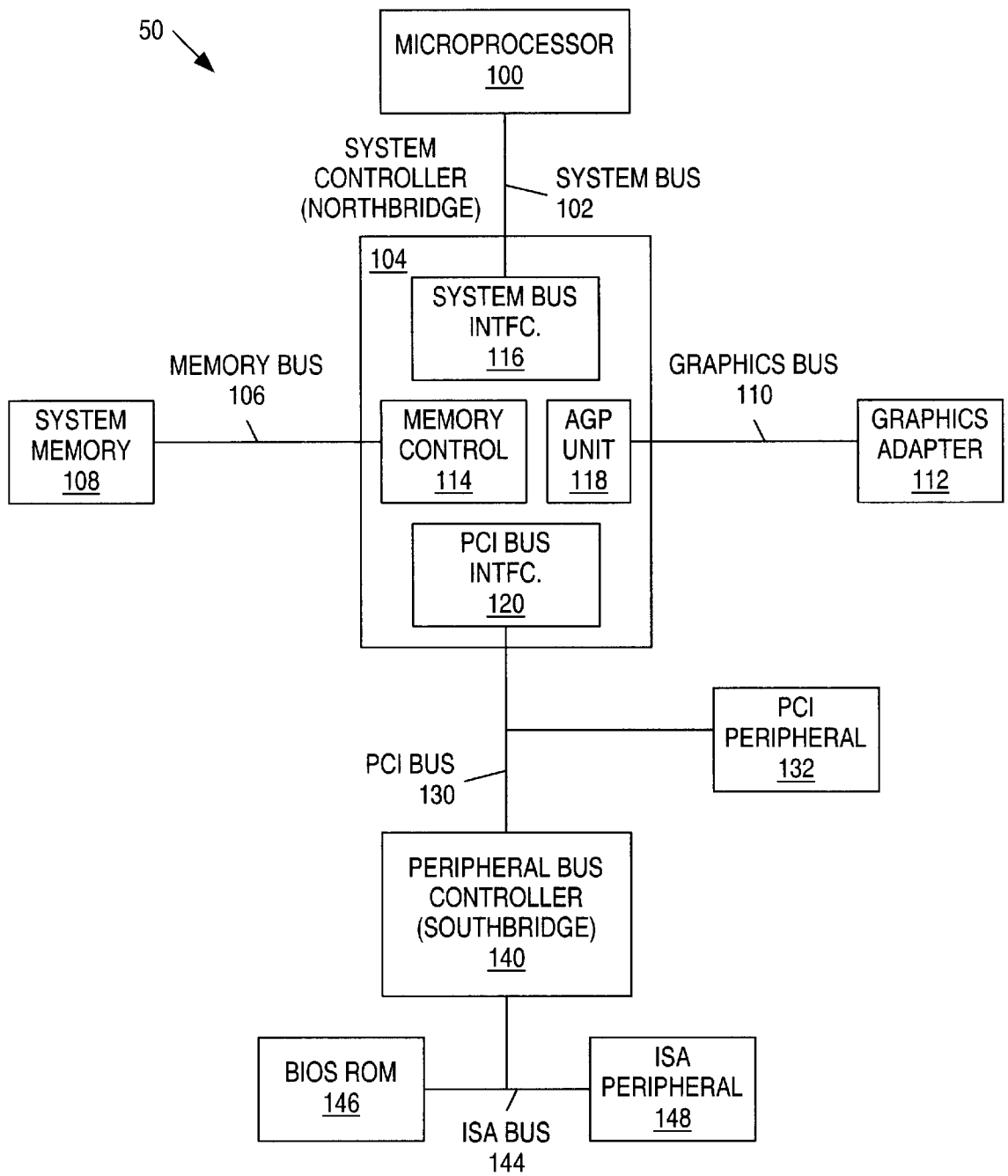
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a diagram of one embodiment of a computer system 50 is shown. The computer system includes a microprocessor 100 coupled to a system controller or northbridge 104 through a system bus 102. Northbridge 104 includes a memory controller 114, which is coupled to the system memory 108 through a memory bus 106. The northbridge 104 also includes an AGP unit 118, which is coupled to a graphics adapter 112 through an AGP bus 110. Northbridge 104 also interfaces to, and controls a PCI bus 130 through the PCI bus controller 120.

Microprocessor 100 is illustrative of, for example, an x86 microprocessor such as a Pentium™ or Athlon™ microprocessor. It is understood, however, that a system according to the present invention may employ other types of microprocessors.

A peripheral bus controller or southbridge 140 is coupled to northbridge 104 through PCI bus 130. Southbridge 140 is also coupled to various peripherals 148 and a BIOS ROM 146 through an ISA bus 144.

When the system power is applied or the system is reset, microprocessor 100 executes initialization code stored within BIOS ROM 146. As microprocessor 100 executes the initialization, or POST code, the system memory 108 is not yet available to microprocessor 100. As will be discussed further below, during execution of the POST code, microprocessor 100 has access to buffer memory associated with a peripheral device during POST code execution.

Figure 2:
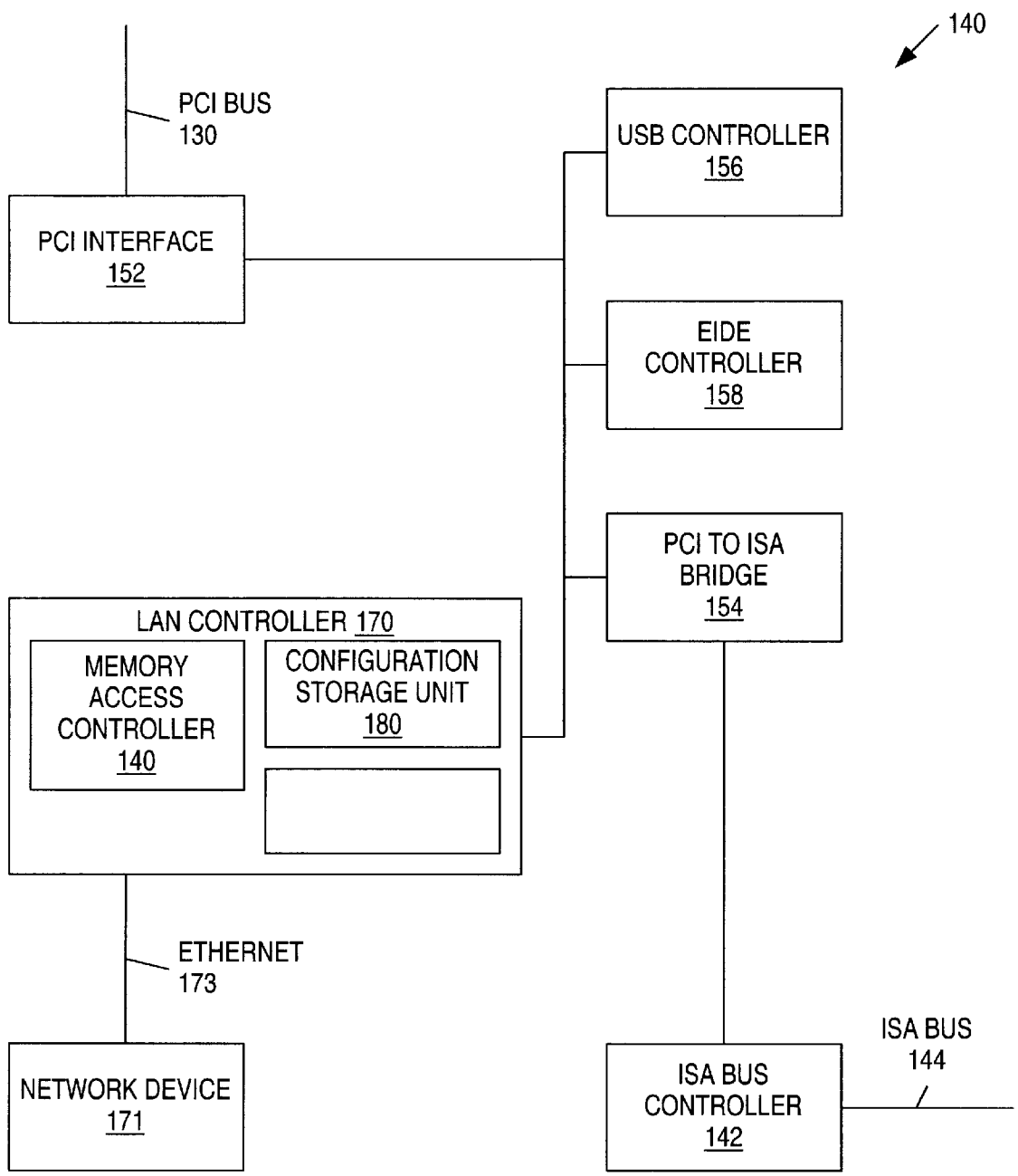
FIG. 2 is a block diagram of one embodiment a southbridge shown in FIG. 1.

Referring to FIG. 2, an embodiment of southbridge 140 is illustrated. Southbridge 140 may include many integrated devices including: A PCI to ISA bridge 154 coupled to PCI bus 130, which contains bridging logic to synchronize the timing between the PCI bus 130 and an ISA bus 144. An ISA bus controller, which is coupled to and controls ISA bus 144. Southbridge also includes other PCI bus 130 peripheral controllers such as a USB controller 156, an EIDE controller 158 and a LAN controller 170.

LAN controller 170 contains a buffer memory (e.g., buffer memory 200). When the system is in a normal mode of operation, buffer memory 200 is used by LAN controller 170 to buffer data between computer system 50 and a network device 171 coupled to LAN controller 170. In the normal mode of operation, buffer memory 200 is configured as a FIFO memory. During POST code execution, computer system 50 operates in an initialization mode and microprocessor 100 uses buffer memory 200 as a stack or scratchpad RAM.

The POST code may include, load and store instructions which specify locations in buffer memory 200. As will be described further below, during POST code execution, a configuration storage unit 180 is configured for operation in the initialization mode. A memory access controller 140 allows a specified address in buffer memory 200 to be accessed in response to initialization instructions executed by microprocessor 100.

When microprocessor 100 finishes executing the POST code, microprocessor 100 executes instructions, such as load and store instructions, which store new configuration values in configuration storage unit 180 of a peripheral device such as LAN controller 170. The new configuration values cause memory access controller 140 to reconfigure the buffer memory (e.g., buffer memory 200) for use by the peripheral device. Further details regarding the reconfiguration of buffer memory 200 will be provided below in conjunction with the accompanying description of FIG. 3.

Figure 3:
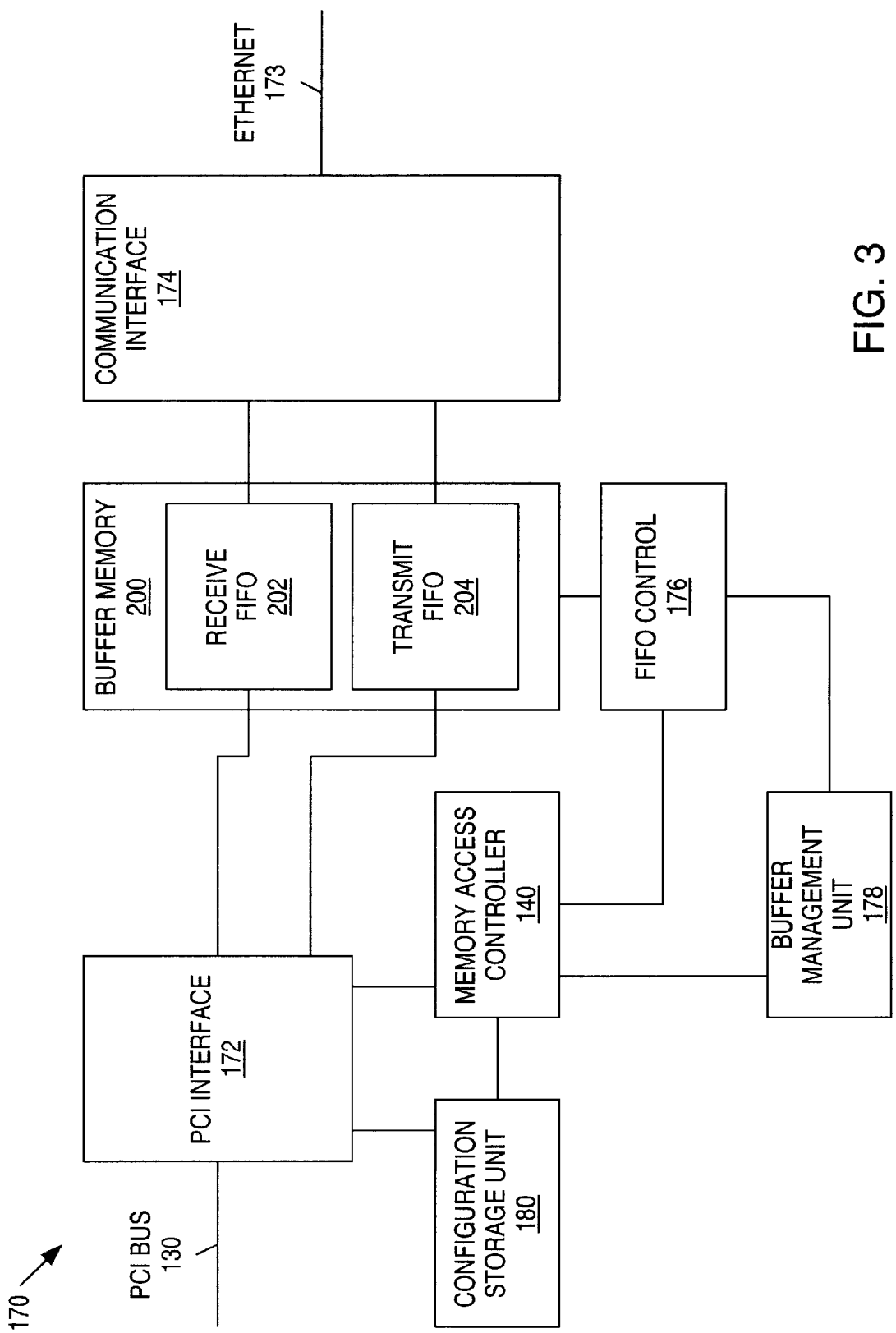
FIG. 3 is a block diagram of one embodiment of an integrated LAN controller shown in FIG. 2.

Referring now to FIG. 3, an exemplary embodiment of the integrated LAN controller 170 of FIG. 2 is shown in greater detail. Circuit components that correspond to those shown in FIG. 2 are numbered identically for simplicity and clarity. A PCI bus 130 is coupled to LAN controller 170 through a PCI interface 172. Buffer memory 200 is coupled to both the PCI interface 172 and a communications interface 174. Internally, buffer memory 200 includes both a transmit FIFO 204 and a receive FIFO 202. PCI interface 172 is also coupled to a memory access controller 140 and a configuration storage unit 180. The memory access controller 140 is coupled to a FIFO control 176 and a buffer management unit 178. Operation of buffer memory 200 is controlled by the combination of configuration storage unit 180, memory access controller 140, FIFO control 176, and buffer management unit 178.

Configuration storage unit 180 contains buffer configuration information which is used by memory access controller 140 and FIFO control 176 to determine whether buffer memory 200 operates as a RAM or as a FIFO memory. Configuration storage unit 180 is an addressable storage location. In one embodiment, configuration storage unit 180 may be an addressable register. At reset, configuration storage unit 180 contains default values, which are maintained throughout the initialization mode of operation. These default values cause control logic to configure buffer memory 200 as a RAM with specific addresses which are software accessible by microprocessor 100. In one embodiment, memory locations of buffer memory 200 are assigned specific addresses mapped within system memory address space. Accordingly, when microprocessor 100 executes an instruction which results in a read cycle or write cycle to a specific address, the read or write cycle is conveyed on PCI bus 130 by the system memory controller 114 of FIG. 1. Memory access controller 190 of FIG. 3 responds to the specific address corresponding to a specific location in buffer memory 200, by latching the address and allowing the read or write cycle to be executed on the buffer memory 200.

At the completion of the POST code, the system memory 108 of FIG. 1 is available for use. The BIOS contains instructions, which when executed by microprocessor 100, reconfigure buffer memory 200 for use as a FIFO memory. Microprocessor 100 issues commands such as load and store instructions, which store a new value in configuration storage unit 180. The new configuration value causes control logic to reconfigure buffer memory 200 into said transmit FIFO 204 and said receive FIFO 202, for use by LAN controller 170 during the normal mode of operation.

In other embodiments, memory associated with alternative peripheral devices may be associated with a memory access controller as described above, wherein specific locations within the device buffer memory are accessible during initialization mode.

Figure 4:
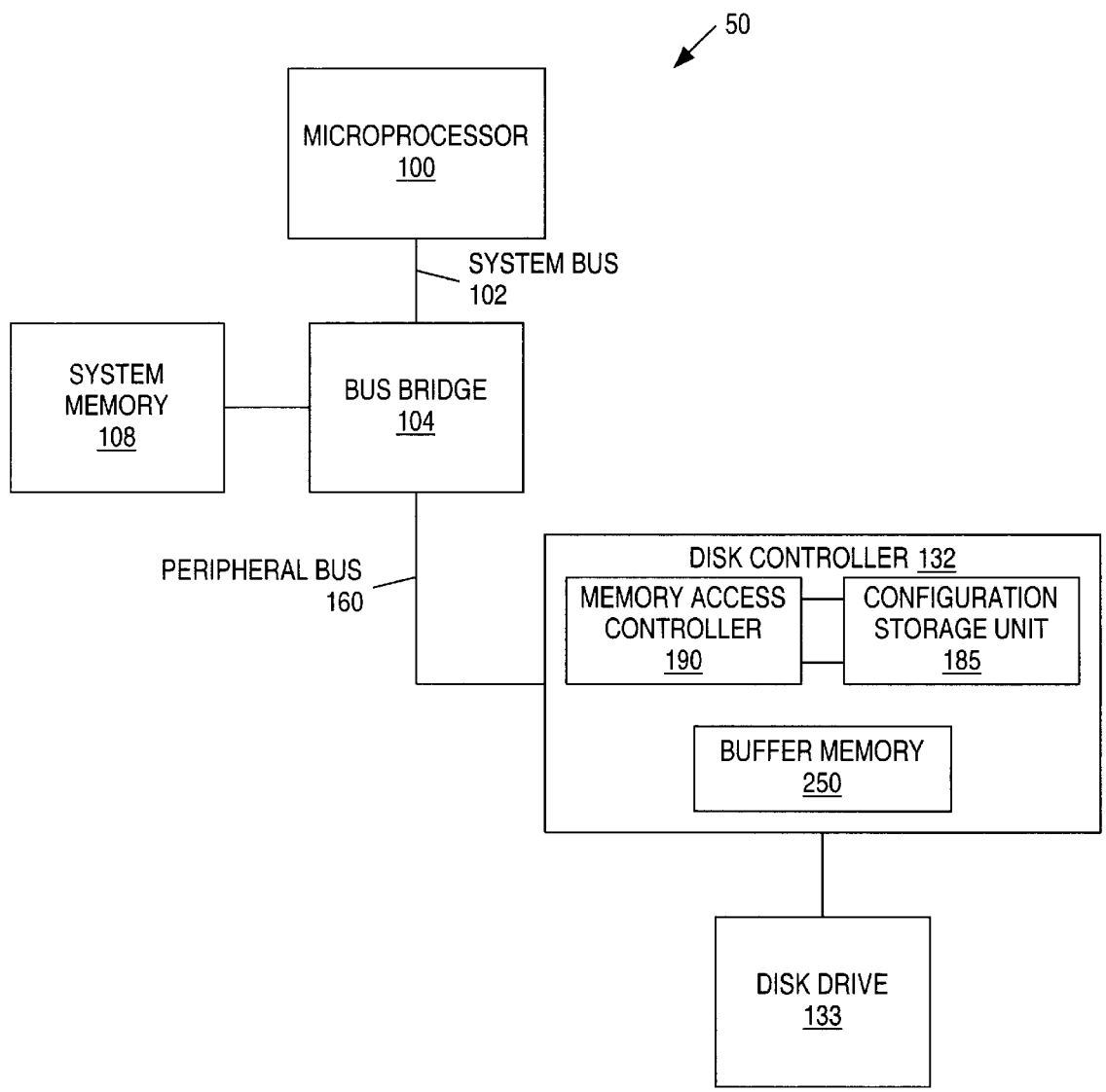
FIG. 4 is a block diagram of an alternate embodiment of a computer system shown in FIG. 1.

Turning now to FIG. 4, an illustration of an alternate embodiment of computer system 50, wherein a peripheral controller, such as a disk controller 132, includes a buffer memory (e.g., buffer memory 250). Disk controller 132 is coupled to a microprocessor 100 through a bus bridge 104 and a peripheral bus 160. A disk drive 133 is coupled to disk controller 132. A memory access controller 190 is coupled to microprocessor 100 through a peripheral bus 160. A configuration storage unit 185 is coupled to memory access controller 190.

During normal mode of operation buffer memory 250 is used to buffer data between bus bridge 104 and disk drive 133. During an initialization mode, buffer memory 250 is used as a stack or scratchpad RAM by microprocessor 100.

Numerous variations and modifications will become apparent to those skilled in the art once the above disclosure is fully appreciated. It is intended that the following claims be interpreted to embrace all such variations and modifications.

What is claimed is:

1. A computer system comprising:
    a microprocessor;
    a first memory unit coupled to said microprocessor for storing boot code, wherein said microprocessor is configured to execute said boot code upon a system reset;
    a second memory unit for buffering data associated with a peripheral device during a normal mode of operation;
    a configuration storage unit for storing configuration control information indicating an initialization mode of operation; and
    a memory access controller coupled to said second memory unit and said configuration storage unit, wherein, during said initialization mode of operation, said memory access controller is configured to control accesses to selected locations within said second memory unit in response to instructions executed by said microprocessor.

2. The system as recited in claim 1, wherein said instructions specify said selected locations in said second memory.

3. The system as recited in claim 2, wherein said selected locations are mapped within a software accessible memory address space of said computer system during said initialization mode of operation.

4. The system as recited in claim 3, wherein said selected locations are not within a software accessible memory address space during said normal mode of operation.

5. The system as recited in claim 1, wherein said first memory unit is a BIOS read-only memory (ROM).

6. The system as recited in claim 2, wherein said second memory operates as a general purpose RAM during said initialization mode.

7. The system as recited in claim 2, wherein said second memory operates as a FIFO buffer during said normal mode of operation.

8. The system as recited in claim 1, wherein said system may contain a plurality of said peripheral devices comprising said second memory units.

9. The system as recited in claim 1, wherein said system may contain a plurality of memory access controllers coupled to a plurality of said second memory units.

10. The system as recited in claim 1, wherein said memory access controller allows random accesses to said buffer memory during said initialization mode of operation.

11. The system as recited in claim 6, wherein said second memory is mapped into system memory address space during said initialization mode.

12. The system as recited in claim 11, wherein said mapping of said second memory unit during said initialization mode is directly accessible by software execution by said microprocessor.

13. A method of operating a computer system comprising:
 executing boot code stored in a first memory during initialization mode;
 accessing specified locations in a second memory during said initialization mode;
 setting configuration information in a configuration storage unit indicating completion of said initialization mode; and
 utilizing the second memory as buffer memory in response to setting the configuration information.

* * * * *